June 11, 1968 A. FEINER ETAL 3,388,271
TIMING CIRCUIT INCLUDING THREE ACTIVE DEVICES AND TWO NETWORKS
FOR RESPECTIVELY CONTROLLING THE DE-ENERGIZATION
TIMES OF TWO OF THE DEVICES
Filed Nov. 27, 1964 2 Sheets-Sheet 1

INVENTORS
A. FEINER
D. J. WATSON
BY Lucian C. Canepa
ATTORNEY

United States Patent Office 3,388,271
Patented June 11, 1968

3,388,271

TIMING CIRCUIT INCLUDING THREE ACTIVE DEVICES AND TWO NETWORKS FOR RESPECTIVELY CONTROLLING THE DE-ENERGIZATION TIMES OF TWO OF THE DEVICES

Alexander Feiner, Red Bank, and Douglas J. Watson, Oceanport, N.J., assignors to Bell Telephone Laboratories, Incorporated, New York, N.Y., a corporation of New York Filed Nov. 27, 1964, Ser. No. 414,300
10 Claims. (Cl. 307—267)

ABSTRACT OF THE DISCLOSURE

A simple and reliable three-transistor timing circuit responds to each change of state appearing at its input to provide complementary output indications whose respective durations are at least equal to a predetermined time interval. The circuit includes a timing network for maintaining one of the transistors de-energized for a minimum specified time in response to a positive-going input signal and a second timing network for maintaining a different one of the transistors de-energized for a minimum specified time in response to a negative-going input signal.

Figure 1:
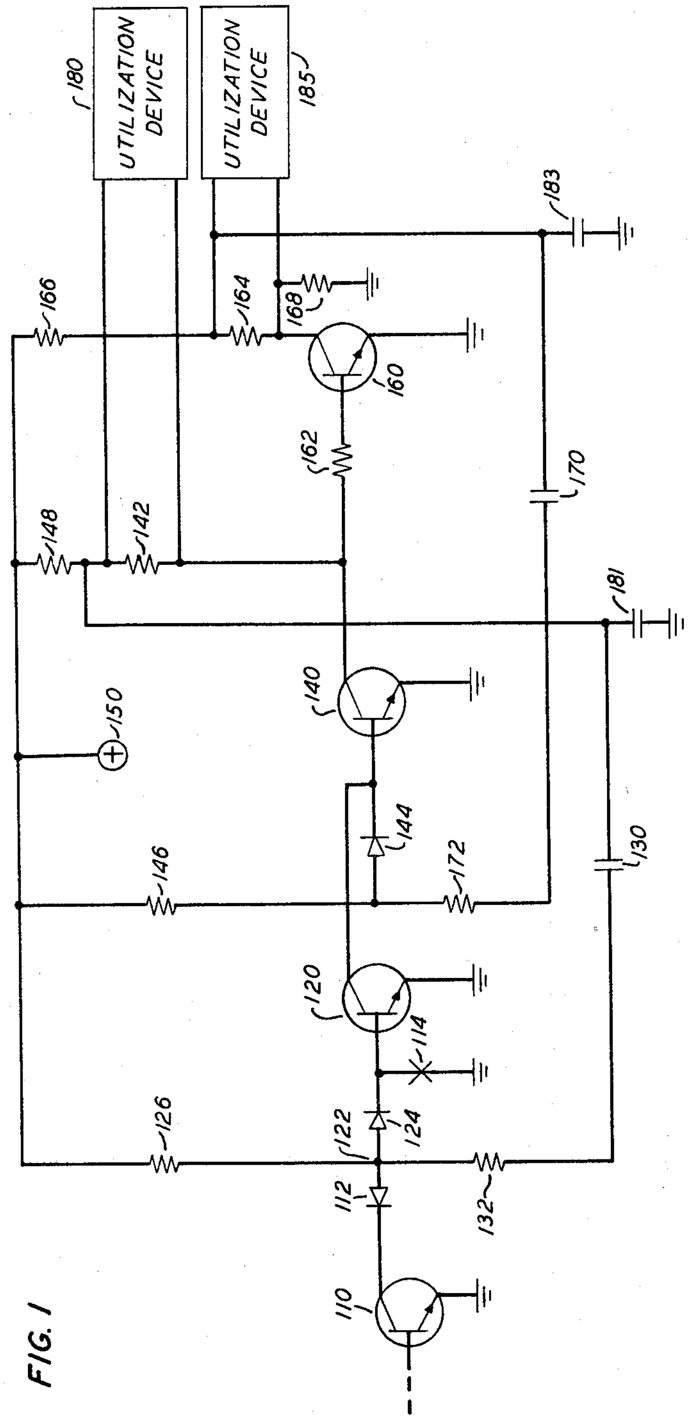

This invention relates to signal translating arrangements and, more particularly, to a circuit whose output signal representations persist for minimum predetermined time intervals in respective response to two distinct input signal conditions.

The processing of electrical signals often results in distortion of the processed signals. Such distortion may in a particular case be sufficiently severe to render the signals ill-suited to perform the task which they were originally designed to accomplish. For example, the duration of a switching pulse may be so shortened during processing that the pulse becomes totally ineffective to perform its assigned switching function. Alternatively, the shortened pulse may still be capable of switching an associated device but may be unable to maintain the device in a switched condition for a period of time sufficiently long to achieve the desired operation thereof.

An object of the present invention is a circuit that ensures that input signals applied thereto appear at the output thereof with minimum specified characteristics.

More specifically, an object of this invention is a timing or stretching circuit that responds to each change of state at its input to provide a corresponding output indication whose duration is at least equal to a predetermined time interval.

A further object of the present invention is an accurate timing circuit that is characterized by extreme simplicity of design, high reliability and ruggedness of construction.

These and other objects of the present invention are realized in a specific illustrative embodiment thereof that comprises first, second, and third common-emitter switching transistors connected in tandem and energized from a single bias source. Input signals are applied to the base of the first transistor and complementary output signals are abstracted from the respective collector paths of the second and third transistors. A first resistive-capacitive timing network has its capacitor connected between the base of the first transistor and the collector of the second transistor, and a second resistive-capacitive timing network has its capacitor connected between the base of the second transistor and the collector of the third transistor. The resistors of the two timing networks respectively connect the bases of the first and second transistors to the bias source.

In one quiescent operating condition of the illustrative embodiment, an input terminal thereof is held at or near ground potential. As a result, the first and third transistors are rendered nonconducting and the second transistor is energized. Under these conditions the capacitor included in the first timing network has its respective plates connected to ground and is therefore discharged. On the other hand, the capacitor included in the second timing network is connected between ground and the aforementioned bias source. Accordingly, this latter capacitor charges to the potential of the source.

An interruption of the input ground condition causes the first and third transistors to conduct and the second transistor to be de-energized. Energization of the third transistor clamps one plate of the charged capacitor at ground potential, thereby immediately driving the other plate thereof to a potential of the polarity to reverse bias the base-to-emitter junction of the second transistor. This charged capacitor then discharges through its associated timing network resistor. The second transistor remains de-energized until the charged capacitor discharges sufficiently to permit the base-to-emitter junction of the second transistor to become forward biased. In this way the condition of the second transistor is controlled by the charged capacitor regardless of whether or not the input terminal is returned to ground in the meantime.

Additionally, the capacitor included in the first timing network responds to the assumed interruption of ground at the input to charge to the potential of the noted bias source.

When the charged capacitor included in the second timing network has discharged to the point at which the second transistor is no longer held nonconducting, control of the energization condition of the second transistor is again under the control of the input. If the input is still ungrounded, the first transistor is in its conducting state and the second transistor is thereby held nonconducting. However, if the input is now grounded, the first transistor is de-energized and the second transistor is free to conduct.

Thus an interruption of ground at the input causes the second transistor of the illustrative embodiment to be de-energized for at least a period of time determined by the parameters of the second capacitive timing network. In turn, the third transistor is energized during the time in which the second transistor is de-energized. As a result, current flows and does not flow, respectively, through the collector paths of the third and second transistors during this minimum predetermined time interval, whereby complementary signals of minimum durations are delivered from these paths to associated output devices.

As noted above, grounding of the input terminal causes the first transistor to be de-energized and allows the second transistor to conduct whenever the capacitor in the second network discharges sufficiently to relinquish control over the second transistor. Energization of the second transistor clamps one plate of the capacitor of the first network to ground, thereby driving the other plate thereof to a potential which maintains the first transistor in its de-energized condition. The first transistor remains de-energized at least until the charge on the noted capacitor decreases to a predetermined level, at which point the energization condition of the first transistor is again under control of the input state. In this manner, grounding of the input terminal results in signals of a minimum predetermined duration being coupled to the noted associated output devices even if the input ground condition is interrupted before the minimum duration has expired.

Thus, an illustrative embodiment made in accordance with the principles of the present invention provides minimum predetermined duration output signals in response to both ground and off-ground input conditions.

It is a feature of the present invention that a timing circuit include first, second, and third transistors connected in tandem and powered by a single bias source and that the circuit further include two capacitive networks, one network interconnecting the bias source, the input of the first transistor and the output of the second transistor, and the other network interconnecting the bias source, the output of the third transistor and the input of the second transistor, whereby there is provided at the outputs of the second and third transistors minimum duration signals in response to both ground and off-ground signals applied to the input of the first transistor.

Figure 2:
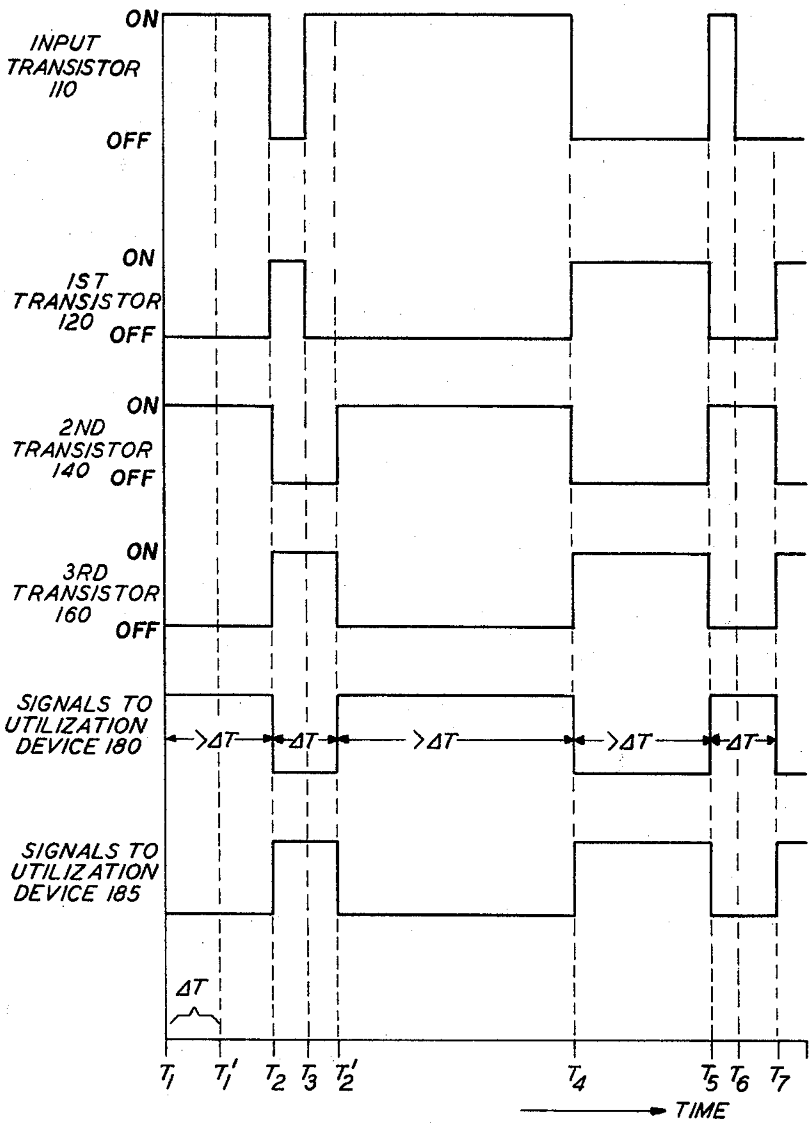

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts a specific illustrative circuit made in accordance with the principles of the present invention; and FIG. 2 depicts various wave forms which are helpful in understanding the mode of operation of the circuit illustrated in FIG. 1.

Referring now to FIG. 1, there are shown first, second, and third grounded-emitter n-p-n switching transistors 120, 140 and 160, respectively. Connected between a node point 122 and the base electrode of the first transistor 120 is an asymmetrically conducting element 124 characterized by a voltage threshold which must be exceeded before appreciable current can be made to flow through. Also connected to the node point 122 via a resistor 126 is a source 150 of positive potential. Resistor 126 is the resistor, which, together with capacitor 130, comprises the first timing network.

The base electrode of the second transistor 140 is directly connected to the collector electrode of the first transistor 120. In addition, the base of the transistor 140 is connected via an asymmetrically conducting threshold element 144 and a resistor 146 to the positive source 150. Resistor 146 is the resistor which, together with capacitor 170, comprises the second timing network. In turn, the collector electrode of the transistor 140 is connected through two series-connected resistors 142 and 148 to the source 150. Also, the collector electrode of the transistor 140 is connected to the base electrode of the third transistor 160 via a resistor 162.

The collector electrode of the third transistor 160 is connected through two series-connected resistors 164 and 166 to the positive source 150. Additionally, a resistor 168 is connected between ground and the collector electrode of the transistor 160.

The capacitor 130 of the first timing network and a resistor 132 are connected between the node point 122 and a junction point between the collector resistors 142 and 148 associated with the second transistor 140. In addition, the capacitor 170 of the second timing network and a resistor 172 are connected between the anode of the element 144 and a junction point point between the collector resistors 164 and 166 of the third transistor 160.

Illustratively, in put signals are applied to the specific circuit shown in FIG. 1 via a grounded-emitter input transistor 110 whose collector electrode is connected to the node point 122 through an asymmetrically conducting element 112. Alternatively, input signals can be applied directly to the base electrode of the first transistor 120 by selectively controlling the operation of normally-open relay contacts 114.

Output signals from the illustrative circuit depicted in FIG. 1 are delivered to a first utilization device 180 and to a second utilization device 185. As will be clear from the detailed description hereinbelow of the operation of FIG. 1, the output signals supplied to the devices 180 and 185 are complementary in nature and persist for minimum predetermined time durations in response to each change of state at the input of the circuit.

Assume for illustrative purposes that input signals are to be applied to the circuit shown in FIG. 1 by means of the input transistor 110. If the transistor 110 is energized by a suitable positive signal applied to the base electrode thereof, the node point 122 is thereby caused to assume a potential that is slightly above ground. In particular, the node point 122 is above ground by the amount of the additive voltage drops across the element 112 and the collector-to-emitter path of the transistor 110. The design of the circuit is such that this near-ground potential is below the voltage needed to exceed the threshold of the element 124 and the forward breakdown voltage of the base-to-emitter junction of the first transistor 120. In other words, the transistor 120 is de-energized in response to the energization of the input transistor 110, as is indicated in FIG. 2 by the two topmost representations in the interval between the times designated $T_1$ and $T_2$.

When the first transistor 120 is de-energized, the second transistor 140 is energized by current flow from the source 150 through the resistor 146 and the element 144 into the base of the transistor 140. In turn, the near-ground potential of the collector electrode of the conducting transistor 140 is insufficient to energize the third transistor 160. Thus, during the interval between $T_1$ and $T_2$, the transistors 120 and 160 are de-energized and the second transistor 140 is energized, as represented in FIG. 2.

Under the particular conditions specified above, the left-hand plate of the capacitor 130 included in the first timing network is connected to a near-ground potential via the resistor 132, the element 112 and the collector-to-emitter path of the input transistor 110. Additionally, the right-hand plate thereof is connected to a near-ground potential through the resistor 142 (which is relatively low-valued) and the collector-to-emitter path of the second transistor 140. Hence the capacitor 130 is uncharged during this phase of the operation of the illustrative circuit shown in FIG. 1.

The left-hand plate of the capacitor 170 included in the second network is also connected to a near-ground potential. Specifically, the left-hand plate of the capacitor 170 is connected to this potential through the resistor 172, the element 144, and the base-to-emitter junction of the transistor 140 which, as noted above, is energized during the interval defined by $T_1$ and $T_2$. However, the right-hand plate of the capacitor 170 is connected via the resistor 166 to the positive source 150. As a result, the capacitor 170 charges to a value (hereinafter designated $+V$) which approximates that of the source 150.

Assume now that at time $T_2$ (FIG. 2) the input transistor 110 shown in FIG. 1 is de-energized or ungrounded. In response thereto current through the resistor 126 from the source 150 is effective to overcome the threshold voltage of the element 124 and to forward bias the base-to-emitter junction of the first transistor 120 to cause the unit 120 to conduct. In turn, conduction of the transistor 120 causes the potential of the base electrode of the second transistor 140 to fall to a value below that necessary to sustain conduction in the unit 140. As a result, the transistor 140 turns off and the third transistor 160 responds to this condition by switching to its conducting state.

It is noted that the time $T_2$ represented in FIG. 2 has for exemplary reasons been chosen to occur subsequent to a time $T_1'$ at which the second timing network, including the capacitor 170, relinquishes control of the energization state of the second transistor 140 to the condition of the input transistor 110. In other words, the time interval $\Delta T$ between $T_1$ and $T_1'$ is the minimum predetermined duration during which the circuit shown in FIG. 1 is designed to apply complementary output signals to the utilization devices 180 and 185. Of course, as described above, these output signals may, under control of input conditions, be applied to the noted devices for a time interval that is longer than the minimum predetermined duration $\Delta T$. The specific illustrative embodiment described herein does ensure, however, that the output signals will always persist for at least the specified minimum periods. Output signals of shorter durations are assumed to be incapable of properly driving the devices 180 and 185.

Specifically, the utilization device 180 shown in FIG. 1 has applied thereto during the time interval between $T_1$ and $T_2$ an output signal which stems from the energization of the second transistor 140. On the other hand, no output signal is applied to the utilization device 185 during that interval because of the corresponding de-energization of the third transistor 160.

Thus the above-described de-energization of the input transistor 110 at time $T_2$ causes the transistors 120 and 160 to be energized and the transistor 140 to be de-energized. In response to these conditions, the capacitor 130 charges to the potential of the source 150 via a path that includes the resistors 148 and 132, the diode element 124, and the base-to-emitter junction of the conducting transistor 120.

Furthermore, energization at time $T_2$ of the third transistor 160 causes the right-hand plate of the capacitor 170 to be clamped at a slightly-above-ground potential, whereby the other or left-hand plate thereof is immediately driven to potential which is below ground by the value to which the capacitor 170 had been charged prior to the time $T_2$. This relatively large negative voltage ($-V$) on the capacitor 170 is effective to maintain the second transistor in its de-energized condition.

Subsequently, the capacitor 170 charges from $-V$ toward $+V$ over a path that includes the resistors 146, 172 and 164, and the collector-to-emitter region of the conducting transistor 160. At some later time the voltage on the capacitor 170 will have decreased to a point at which the transistor 140 is no longer maintained cut off. At that time, control of the energization state of the unit 140 is returned to the input transistor 110.

To illustrate the action of the capacitor 170 in maintaining the second transistor 140 de-energized, assume that the input transistor 110 is again turned on at a time designated $T_3$ in FIG. 2. (Assume further that this change of state is premature in the sense that output signals of exactly corresponding durations would be incapable of properly operating the devices 180 and 185.) In response thereto, the transistor 120 stops conducting, which ordinarily would cause the second transistor 140 to be energized. However, the unit 140 is maintained off by the negative voltage applied thereto by the capacitor 170. Additionally, the third transistor 160 is maintained energized by the continued de-energization of the transistor 140. Accordingly, output signals continue to be applied to the devices 180 and 185 despite the premature grounding of the input unit 110. Specifically, these output signals continue to be applied to the utilization devices until the capacitor 170 has charged to a positive potential sufficient to break down the element 144 and the base-to-emitter junction of the transistor 140. At that point, designated $T_2'$ in FIG. 2, the transistor 140 turns on and the transistor 160 is, accordingly, turned off. Correspondingly, the complementary output signals delivered to the devices 180 and 185 then terminate, as represented by the wave forms in FIG. 2.

Subsequent to the time marked $T_2'$ in FIG. 2, the first and third transistors 120 and 160 are de-energized and the second transistor 140 is energized. As a result, the capacitor 130 is discharged and the capacitor 170 is charged to the value $+V$. Then at the time $T_4$ the input transistor 110 is again de-energized and, therefore, in the same manner specified above, the first and third transistors are energized and the second transistor is de-energized. Later, at time $T_5$ the input transistor is turned on, which causes the signals applied to the utilization devices 180 and 185 to terminate, as shown in FIG. 2. Note that the durations of these particular output signals exceed the minimum predetermined intervals $\Delta T$ characteristic of the circuit described herein and that, accordingly, the two timing networks considered above are not involved in controlling the periods of these particular signals.

The turning on of the second transistor 140 at time $T_5$ clamps the right-hand plate of the capaictor 130 at a near-ground potential. As a result, the left-hand plate thereof is driven to a potential of approximately $-V$. Hence, even if the input transistor turns off prematurely at time $T_6$, illustrated in FIG. 2, the first transistor 120 remains de-energized due to the control thereover by the capacitor 130. This control persists for the minimum predetermined time period $\Delta T$ embodied in the illustrative circuit and does not permit the unit 120 to turn on until a subsequent time $T_7$. Accordingly, the output signals applied to the utilization devices 180 and 185 in response to the energization of the input transistor 110 persist for the minimum predetermined time period $\Delta T$.

Thus, it has been demonstrated that every input change of state applied to the specific illustrative circuit shown in FIG. 1 results in output signals of at least a predetermined duration $\Delta T$ being delivered to the utilization devices 180 and 185. In particular, it is noted that both the positive and negative-going excursions of the output signals are controlled to persist for at least that minimum duration. In this sense, the circuit depicted in FIG. 1 may be regarded as a double pulse stretcher.

The circuit illustrated in FIG. 1 is characterized by its extreme simplicity of design. For example, only a single source and three transistors are required in the particular circuit described herein to accomplish the noted double pulse stretching function. Moreover, the control circuitry for the capacitors 130 and 170 is arranged in a particular configuration which ensures that minimum duration timing of the transistors 120 and 140 is substantially independent of variations in the value of the source 150. This characteristic of the circuit stems from the fact that the capacitors 130 and 170 relinquish control over their respective transistors at a point approximately equal to one-half the voltage impressed across each of them. This characteristic of voltage independence, as applied to a precise two-transistor time delay circuit comprising a single resistive-capacitive timing network, is described in more detail in an article entitled "A Transistorized Time Delay Circuit ," by M. E. Krom, which appears in the February 1964 issue of the Bell Laboratories Record, at pages 59–60.

Although the circuit of FIG. 1 has been described herein for the particular case in which the minimum predetermined time duration imposed by the first timing network is the same as that imposed by the second network which comprises the capacitor 170, this identity of timing durations is not an essential characteristic of the invention. In other words, the parameters of the first timing network can be selected to control the first transistor 120 for a predetermined interval and the parameters of the second network can be selected to control the second transistor 140 for a different predetermined interval.

In one actual embodiment of the principles of the present invention, the capacitors 130 and 170 are, for ease of accessibility, mounted external to the remainder of the circuit shown in FIG. 1, whereby their values can be easily varied to meet particular timing requirements. In such an embodiment, the leads connecting the capacitors 130 and 170 to the remainder of the circuit may be so long as to introduce an undesirably high level of noise into the circuit. In such a case, noise filter capacitors 181 and 183 (FIG. 1) may advantageously be connected to these leads to provide relatively low impedance paths to ground for noise signals.

Also, the illustrative circuit described herein may advantageously include a resistor 168 connected between ground and the collector electrode of the third transistor 160 so as to approximately equalize the voltages to which the capacitors 130 and 170 charge when the transistors 140 and 160 are respectively de-energized. Specifically, the value of the resistor 168 is selected to be equal to the value of the resistor 162 which is connected between the collector electrode of the transistor 140 and the base electrode of the unit 160.

In order for the circuit described herein to respond in a reliable manner to a change of state of the input transistor 110 (or of the relay contacts 114), the change of state thereof must persist for a minimum period of time. If it does not persist for at least the minimum period, the circuit does not change its condition and the utilization devices 180 and 185 are insensitive to the change at the input. For example, for the illustrative circuit whose parameters are specified below, the input change of state must endure for at least 100 nanoseconds. Changes of shorter durations are simply ignored by the circuit. If the resistors 132 and 172 shown in FIG. 1 are omitted, the minimum input period required for reliable operation increases to approximately 250 microseconds. The required input duration can be further increased by substituting a relatively high threshold multiple junction diode for the element 124 and, in addition, by inserting a multiple junction diode in series in the lead which directly connects the collector electrode of the transistor 120 to the base electrode of the transistor 140.

The elements included in the circuit of FIG. 1 may assume the following illustrative values for the specific case in which the minimum predetermined timing intervals $\Delta T$ is 13 milliseconds.

Resistors 126 and 146—each 39,200 ohms
Resistors 148 and 166—each 2,000 ohms
Resistors 142 and 164—each 120 ohms
Resistors 162 and 168—each 39,000 ohms
Resistors 132 and 172—each 1,200 ohms
Capacitors 130 and 170—each 0.535 microfarad
Capacitors 181 and 183—each 0.02 microfarad
Bias source 150—+24 volts
Transistors 110, 120, 140, 160—each W.E. type 29A
Diodes 112, 124, and 144—each W.E. type 447A.

It is to be understood that the above-described embodiments are only illustrative of the application of the principles of the present invention. Numerous other arrangements may be devised by those skilled in the art without departing from the spirit and scope of the invention.

What is claimed is:

1. In combination in a timing circuit, first, second and third switching devices each characterized by first and second stable states and each having an input and an output, first means connecting the output of said first device to the input of said second device, second means connecting the output of said second device to the input of said third device, third means for biasing said first and third devices to the same one of said first and second stable states and for simultaneously biasing said second device to the other one of said stable states, first capacitance network means connected between the input of said first device and the output of said second device, and second capacitance network means connected between the input of said second device and the output of said third device, whereby the application to said circuit of an input pulse that causes said first device to be de-energized causes circuitry connected to the output of said third device to be de-energized for a minimum predetermined time interval which is a function of the parameters of said first capacitance network means and whereby the application to said circuit of an input pulse that causes said first device to be energized causes said output circuitry to be energized for a minimum predetermined time interval which is a function of the parameters of said second capacitance network means.

2. In combination, first, second and third switching means each including input and output circuitry and each characterized by an energized and a de-energized stable state, means connecting said switching means in tandem and for biasing said first and third switching means to the same one of said stable states and for simultaneously biasing said second switching means to the other one of said stable states, first network means connected between the input circuitry of said first switching means and the output circuitry of said second switching means for controlling the energization condition of said first switching means during a predetermined interval of time, and second network means connected between the input circuitry of said second switching means and the output circuitry of said third switching means for controlling the energization condition of said second switching means during a predetermined interval of time.

3. A combination as in claim 2 wherein said first and second network means include respective timing capacitors and resistors.

4. A combination as in claim 3 further including first and second utilization devices respectively connected to the output circuitry of said second and third switching means.

5. A combination as in claim 4 still further comprising threshold elements respectively included in said first and second network means and connected between the respective timing capacitors of said first and second network means and the input circuitry of said first and second switching means.

6. A combination as in claim 5 wherein each of said first and second network means further includes a resistor connected in series between the capacitor and the threshold element thereof.

7. A combination as in claim 6 further including input switching means connected to the input circuitry of said first switching means.

8. A combination as in claim 7 wherein said input switching means comprises a transistor and a threshold element connected in series between a point of reference potential and a point of said first network means which is intermediate the resistor and threshold element included therein.

9. A combination as in claim 7 wherein said input switching means comprises normally-open relay contacts connected between said point of reference potential and the input circuitry of said first switching means.

10. In combination in a double pulse stretching circuit, first, second and third grounded-emitter switching transistors each including base, emitter and collector electrodes, a lead directly connecting the collector electrode of said first transistor to the base electrode of said second transistor, a first resistor connected between the collector electrode of said second transistor and the base electrode of said third transistor, a first threshold diode element having one terminal thereof connected to the base electrode of said first transistor, a second threshold diode element having one terminal thereof connected to the base electrode of said second transistor, a source of potential, a second resistor connected between the other terminal of said first diode element and said source, a third resistor connected between the other terminal of said second diode element and said source, fourth and fifth series-connected resistors connected between the collector electrode of said second transistor and said source, sixth and seventh series-connected resistors connected between the collector electrode of said third transistor and said source, an eighth resistor connected between ground and the collector electrode of said third transistor, a first resistor-capacitor series arrangement connected between the other terminal of said first diode element and a point between said fourth and fifth resistors, a second resistor-capacitor series arrangement connected between the other terminal of said second diode element and a point between said sixth and seventh resistors, an input switching device connected to said first diode element, and output utilization devices respectively connected across said fifth and seventh resistors.

References Cited

UNITED STATES PATENTS

| | | | |
|---|---|---|---|
| 2,837,663 | 6/1958 | Walz | 307—88.5 |
| 2,933,625 | 4/1960 | Townsend | 307—88.5 |
| 2,949,545 | 8/1960 | White | 307—88.5 |

JOHN S. HEYMAN, *Primary Examiner.*